(12) United States Patent
Aihara et al.

(10) Patent No.: US 10,447,948 B2
(45) Date of Patent: Oct. 15, 2019

(54) IMAGING SYSTEM AND DISPLAY SYSTEM

(71) Applicant: Panasonic Intellectual Property Management Co., Ltd., Osaka (JP)

(72) Inventors: Masayuki Aihara, Osaka (JP); Yoshio Matsumura, Osaka (JP); Shigenori Yatsuri, Osaka (JP); Hiroyuki Shobayashi, Hyogo (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 16/035,595

(22) Filed: Jul. 14, 2018

(65) Prior Publication Data
US 2018/0332243 A1 Nov. 15, 2018

Related U.S. Application Data

(63) Continuation of application No. PCT/JP2017/043724, filed on Dec. 6, 2017.

(30) Foreign Application Priority Data

May 12, 2017 (JP) .................................. 2017-095984

(51) Int. Cl.
*H04N 5/341* (2011.01)
*H04N 5/232* (2006.01)
(Continued)

(52) U.S. Cl.
CPC .............. *H04N 5/341* (2013.01); *B60R 1/00* (2013.01); *B60R 1/02* (2013.01); *B60R 1/12* (2013.01);
(Continued)

(58) Field of Classification Search
CPC .... H04N 5/341; H04N 5/217; H04N 5/23229; H04N 5/23238; B60R 1/00; B60R 1/022;
(Continued)

(56) References Cited

U.S. PATENT DOCUMENTS 8,736,680 B1* 5/2014 Cilia ...................... H04N 5/247
348/148
8,908,041 B2* 12/2014 Stein .................. G06K 9/00791
348/148
(Continued)

FOREIGN PATENT DOCUMENTS

JP  2004-064795  2/2004
JP  2007-043392  2/2007
(Continued)

OTHER PUBLICATIONS

International Search Report of PCT application No. PCT/JP2017/043724 dated Jan. 30, 2018.

*Primary Examiner* — Pritham D Prabhakher
(74) *Attorney, Agent, or Firm* — Renner, Otto, Boisselle & Sklar, LLP

(57) ABSTRACT

Imaging system (70) disposed at a rear part of moving body (100) includes imaging device (10) and image processing device (20). Imaging device (10) includes an imaging element and an optical system. The imaging element has a plurality of pixels arranged in a two-dimensional manner and generates image data. The optical system forms a subject image on an imaging surface of the imaging element. Image processing device (20) generates a captured image based on the image data. The imaging surface includes a first region corresponding to a first view angle and a second region corresponding to a second view angle that is larger than the first view angle. The optical system is configured so that resolution of the first region is higher than resolution of the second region excluding the first region. A center of the first region is disposed at a position deviated from a center of the imaging surface.

8 Claims, 15 Drawing Sheets

(51) Int. Cl.
*H04N 5/217* (2011.01)
*G06T 3/00* (2006.01)
*B60R 1/02* (2006.01)
*B60R 1/12* (2006.01)
*G02B 13/06* (2006.01)
*B60R 1/00* (2006.01)

(52) U.S. Cl.
CPC ............ *G02B 13/06* (2013.01); *G06T 3/0012* (2013.01); *G06T 3/0018* (2013.01); *H04N 5/217* (2013.01); *H04N 5/23229* (2013.01); *H04N 5/23238* (2013.01); *B60R 2001/1253* (2013.01); *B60R 2300/108* (2013.01); *B60R 2300/20* (2013.01); *B60R 2300/30* (2013.01)

(58) Field of Classification Search
CPC .............. B60R 1/12; B60R 2001/1253; B60R 2300/108; B60R 2300/20; B60R 2300/30; G02B 13/06; G06T 3/0012; G06T 3/0018
USPC .......................................................... 348/308
See application file for complete search history.

(56) References Cited

U.S. PATENT DOCUMENTS

| | | | |
|---|---|---|---|
| 9,286,522 B2* | 3/2016 | Stein | G06K 9/00791 |
| 9,445,011 B2* | 9/2016 | Zhang | B60R 1/088 |
| 9,773,176 B2* | 9/2017 | Kosaki | G06K 9/00805 |
| 10,162,360 B2* | 12/2018 | Gao | B60K 35/00 |
| 2004/0017491 A1 | 1/2004 | Stavely | |
| 2007/0046804 A1 | 3/2007 | Hirano et al. | |
| 2010/0302647 A1 | 12/2010 | Hirose | |
| 2014/0111637 A1* | 4/2014 | Zhang | B60R 1/088 348/118 |
| 2014/0198184 A1* | 7/2014 | Stein | G06K 9/00791 348/47 |
| 2015/0009285 A1* | 1/2015 | Morishima | B60R 1/00 348/36 |
| 2015/0062304 A1* | 3/2015 | Stein | G06K 9/00791 348/47 |
| 2015/0269449 A1* | 9/2015 | Kosaki | G06K 9/00805 382/103 |
| 2016/0044284 A1* | 2/2016 | Goseberg | H04N 5/23238 348/148 |
| 2017/0050569 A1 | 2/2017 | Kuwabara et al. | |
| 2017/0132479 A1* | 5/2017 | Krokel | G06K 9/00818 |
| 2017/0269327 A1* | 9/2017 | Mori | G02B 9/62 |
| 2017/0302855 A1* | 10/2017 | Usui | H04N 5/23203 |
| 2018/0054607 A1* | 2/2018 | Cole | H04N 13/243 |
| 2018/0157267 A1* | 6/2018 | Gao | B60K 35/00 |

FOREIGN PATENT DOCUMENTS

| | | |
|---|---|---|
| JP | 2007-067677 | 3/2007 |
| JP | 2007-096588 | 4/2007 |
| JP | 2010-276755 | 12/2010 |
| JP | 2016-126254 | 7/2016 |
| JP | 2016-166010 | 9/2016 |

* cited by examiner

FIG. 14

| SYSTEM | | CONVENTIONAL EXAMPLE | COMPARATIVE EXAMPLE | FIRST EXEMPLARY EMBODIMENT |
|---|---|---|---|---|
| INPUT SIDE | NUMBER OF CAMERAS | 2 | 1 | 1 |
| | NUMBER OF PIXELS OF ELEMENT | 1.3M × 2 | 8M OR MORE | ABOUT 2M |
| | TYPE OF LENS | ELECTRONIC ROOM MIRROR: OPTICAL SYSTEM USING NORMAL LENS ONLY IN-VEHICLE DISPLAY: OPTICAL SYSTEM USING NORMAL LENS ONLY (FISHEYE) | OPTICAL SYSTEM USING NORMAL LENS ONLY (FISHEYE) | OPTICAL SYSTEM USING FREE CURVED SURFACE LENS (FISHEYE) |
| | ELECTRONIC ROOM MIRROR CUT-OUT AREA OPTICAL MAGNIFICATION | (H) × 1.0 (REFERENCE) (V) × 1.0 (REFERENCE) | (H) × 1.0 (V) × 1.0 | (H) × 1.5 OR MORE (*) (V) × 1.5 OR MORE (*) |
| | VIEW ANGLE | ELECTRONIC ROOM MIRROR: (H) ABOUT 80° (V) ABOUT 60° REAR VIEW: (H) ABOUT 200° (V) ABOUT 150° | (H) ABOUT 200° (V) ABOUT 150° | (H) ABOUT 200° (V) ABOUT 150° |
| | CUT-OUT VIEW ANGLE | | (H) 61° (V) 63° | |
| OUTPUT SIDE | ELECTRONIC ROOM MIRROR RESOLUTION | REFERENCE | ← (IDENTICAL) | ← (IDENTICAL) |

(*) NUMERICAL VALUE INCREASED OR DECREASED BY NUMBER OF LENSES/SIZE/OTHER OPTICAL DESIGN CONDITIONS

IMAGING SYSTEM AND DISPLAY SYSTEM

TECHNICAL FIELD

The present disclosure relates to an imaging system that generates a plurality of images having different view angles and a display system that displays the images generated by the imaging system.

BACKGROUND ART

Instead of a conventional room mirror, an electronic room mirror that also has a function of displaying a captured image behind a vehicle (hereinafter referred to as an electronic room mirror) is mounted on an automobile. PTL 1 discloses a technique about such an electronic room mirror.

Unexamined Japanese Patent Publication No. 2016-166010 discloses an in-vehicle display apparatus provided with a display unit. The display unit is installed at a mounting position of a room mirror within a cabin. The display unit includes an image display unit and a half mirror. The image display unit displays an image captured by an imaging unit mounted on a vehicle. The half mirror is disposed on a front surface of the image display unit. The display unit changes a display image according to a lighting state of an interior lamp. This prevents degradation of visibility caused by light of the interior lamp.

SUMMARY OF THE INVENTION

In addition to the above-described electronic room mirror, a vehicle mounted with an in-vehicle display is popular. When the vehicle is parked, the in-vehicle display is used as a rear view monitor to support a driver. The in-vehicle display displays an image that indicates a situation behind the vehicle. In this case, various images are displayed, in one vehicle, on a plurality of imaging devices according to a purpose. Since it is necessary that the vehicle mounts the plurality of imaging devices corresponding to a plurality of display apparatuses, a configuration of a display system mounted on the vehicle becomes complicated.

The present disclosure provides a display system with a simple configuration that displays a plurality of images having different view angles. Further, the present disclosure provides an imaging system for realizing such a display system.

A first aspect of the present disclosure provides an imaging system disposed at a rear part of a moving body. The imaging system includes an imaging device and an image processing device. The imaging device includes an imaging element and an optical system. The imaging element has a plurality of pixels arranged in a two-dimensional manner and generates image data. The optical system forms a subject image on an imaging surface of the imaging element. The image processing device generates a captured image based on the image data. The imaging surface includes a first region corresponding to a first view angle and a second region corresponding to a second view angle that is larger than the first view angle. On the imaging surface, when a number of pixels per unit view angle of the plurality of pixels is defined as resolution, the optical system is configured so that the resolution of the first region is higher than the resolution of the second region excluding the first region. A center of the first region is disposed at a position deviated from a center of the imaging surface.

A second aspect of the present disclosure provides the imaging system, a display apparatus that displays at least one of the first image and the second image, and a display system.

According to the present disclosure, one imaging device can generate a plurality of images having different view angles. Therefore, a configuration of the display system can be simplified.

BRIEF DESCRIPTION OF DRAWINGS

FIG. 14 is a table comparing characteristics of the display system according to the first exemplary embodiment with characteristics of display systems in a conventional example and the comparative example.

DESCRIPTION OF EMBODIMENTS

Hereinafter, exemplary embodiments will be described in detail with reference to the drawings as appropriate. However, unnecessarily detailed description may be omitted. For example, the detailed description of already well-known matters and the overlap description of substantially identical configurations may be omitted. Such omissions are made in order to avoid unnecessary redundancy of the following description and to facilitate understanding of those skilled in the art.

Here, the inventor provides the attached drawings and the following description such that those skilled in the art can sufficiently understand the present disclosure, and therefore, they do not intend to restrict the subject matters of claims

First Exemplary Embodiment

[1-1. Configuration]

Figure 1:
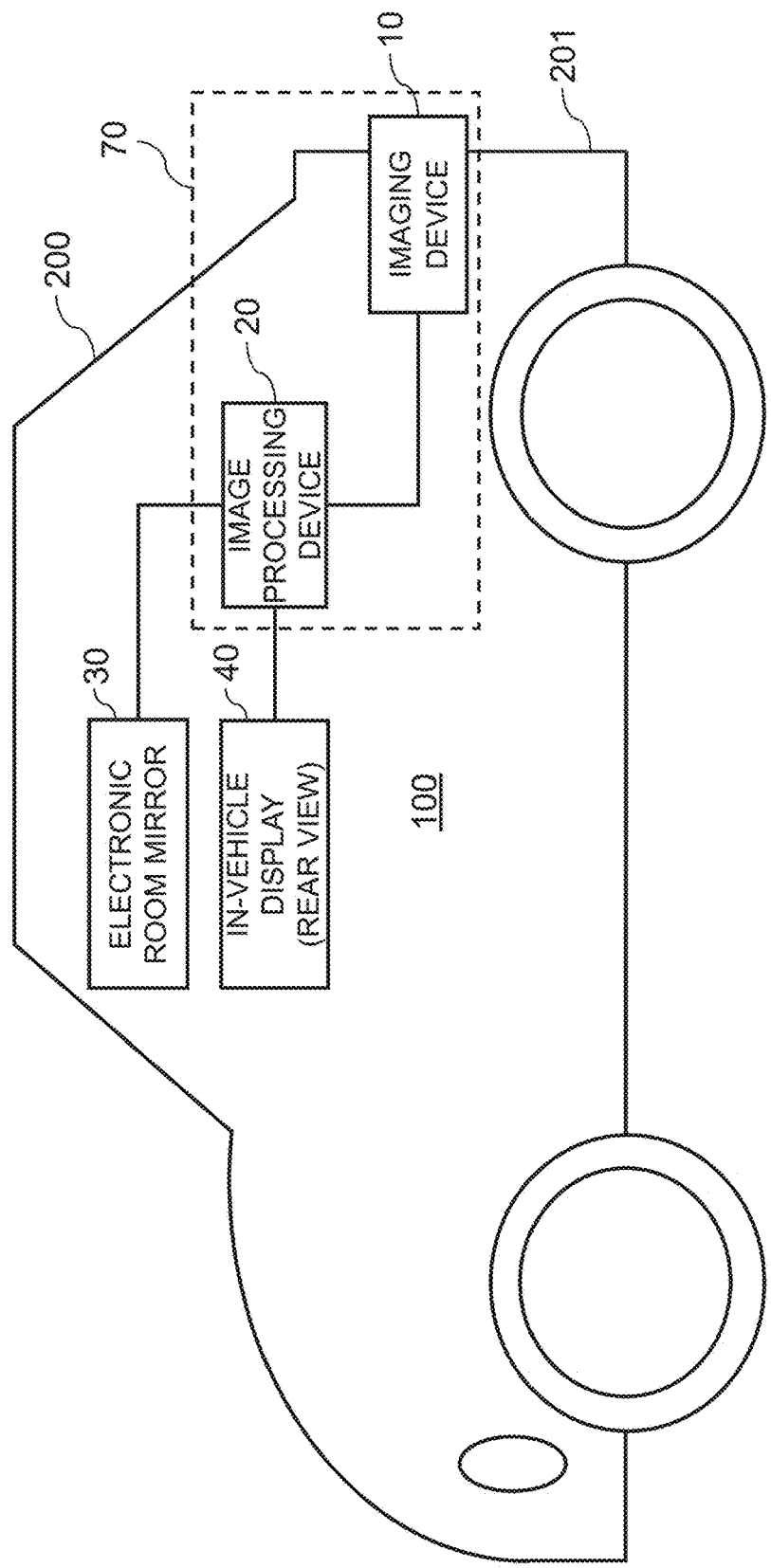
FIG. 1 is a diagram illustrating a configuration of a display system, which is mounted on a vehicle, according to a first exemplary embodiment.

FIG. 1 is a diagram illustrating a configuration when a display system according to a first exemplary embodiment of the present disclosure is mounted on a vehicle of an automobile. Display system 100 is mounted on vehicle 200 of the automobile. The automobile is an example of a moving body. Display system 100 includes imaging device 10, image processing device 20, electronic room mirror 30, and in-vehicle display 40. Imaging device 10 images a scene behind the vehicle and generates image data. Image processing device 20 processes the image data generated by imaging device 10. Electronic room mirror 30 and in-vehicle display 40 each display an image generated by image processing device 20. Electronic room mirror 30 is an example of a first display apparatus in the present disclosure. In-vehicle display 40 is an example of a second display apparatus in the present disclosure. Imaging device 10 and image processing device 20 constitute imaging system 70.

[1-1-1. Display Apparatus]

A display apparatus in the first exemplary embodiment includes a first display apparatus and a second display apparatus.

Electronic room mirror 30 serving as the first display apparatus includes a display device and a drive circuit. The display device is a liquid crystal display panel, an organic electro luminescence (EL) display, or the like. The drive circuit drives the display device. Electronic room mirror 30 is a display apparatus that functions as a room mirror. Electronic room mirror 30 is disposed, in front of a driver's seat, at an upper part of the vehicle and a center in a horizontal direction of the vehicle. Electronic room mirror 30 displays an image (a moving image) of a scene behind the vehicle captured by imaging device 10. With this configuration, when vehicle 200 is running or stopped, a driver of vehicle 200 can confirm a situation behind the vehicle using the image of electronic room mirror 30.

In-vehicle display 40 serving as the second display apparatus includes a display device and a drive circuit. The display device is a liquid crystal display panel, an organic EL display, or the like. The drive circuit drives the display device. In-vehicle display 40 is installed in a dashboard or on the dashboard. In-vehicle display 40 displays various information (at least any one of a map, route guidance, music selection by radio, various settings, and the like). Further, when vehicle 200 moves backwards, in-vehicle display 40 displays an image of a scene behind the vehicle imaged by imaging device 10 (hereinafter referred to as a "rear view image"). By confirming the rear view image (the moving image) when reversing vehicle 200, the driver can grasp a situation behind the vehicle and can safely drive the vehicle in reverse.

Figure 2:
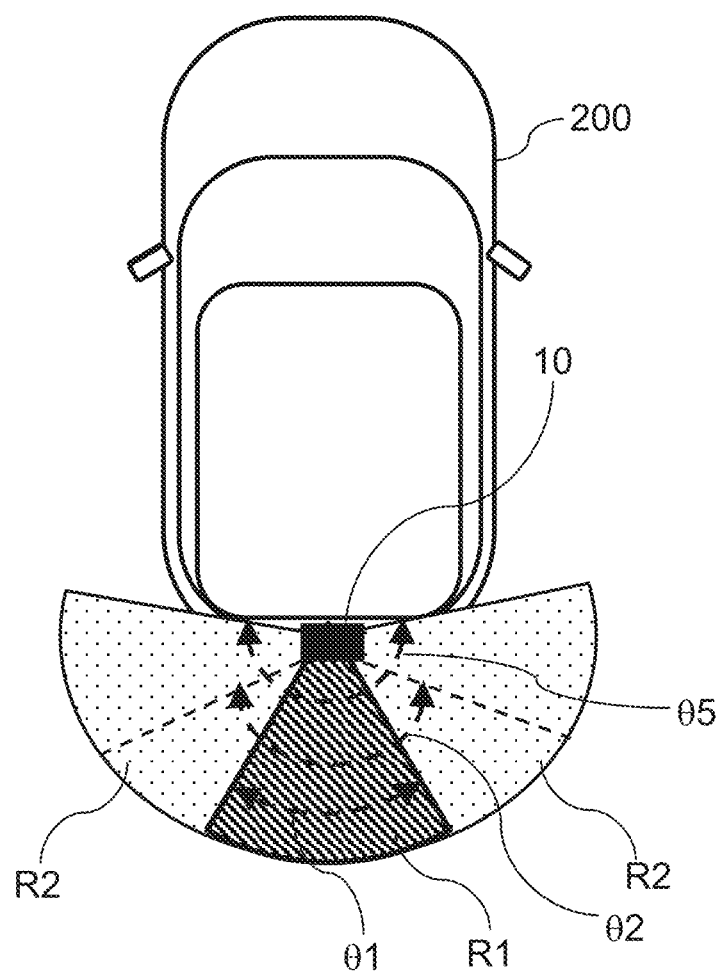
FIG. 2 is a view for describing a view angle in a horizontal direction of an imaging device according to the first exemplary embodiment.

FIG. 2 is a view for describing a view angle in a horizontal direction of imaging device 10. Imaging device 10 is mounted to a rear part of vehicle 200. Imaging device 10 generates image data obtained by imaging a scene behind the vehicle. The view angle in the horizontal direction is θ5. θ5 is about 200°.

Figure 13:
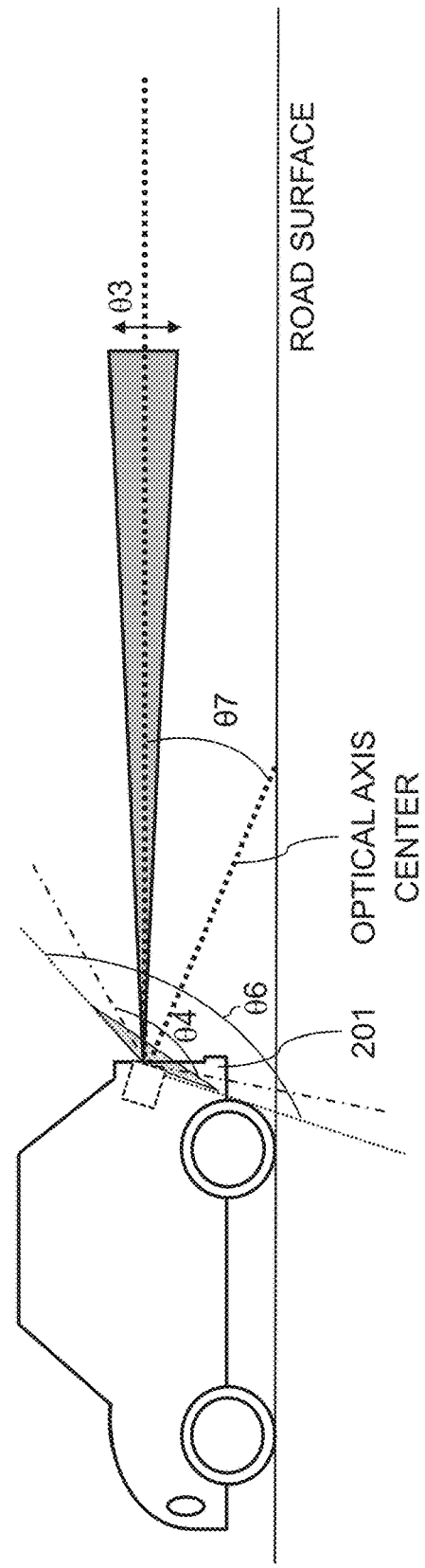
FIG. 13 is a view for describing a view angle in a vertical direction of the imaging device according to the first exemplary embodiment.

FIG. 13 is a view for describing a view angle in a vertical direction of imaging device 10. Imaging device 10 is disposed by directing an optical axis center obliquely downward so that rear bumper 201 is imaged. In other words, depression angle θ7 is formed between the horizontal direction and an optical axis direction of imaging device 10. Depression angle θ7 is set appropriately from a relationship between the view angle and a mounting position of imaging device 10 on the vehicle. For example, depression angle θ7 in the first exemplary embodiment is 20°. The view angle in the vertical direction is θ6. θ6 is about 150°. However, depression angle θ7 is not limited to the range from 10° to 50° inclusive, and may range from 0° to 90°.

Figure 3:
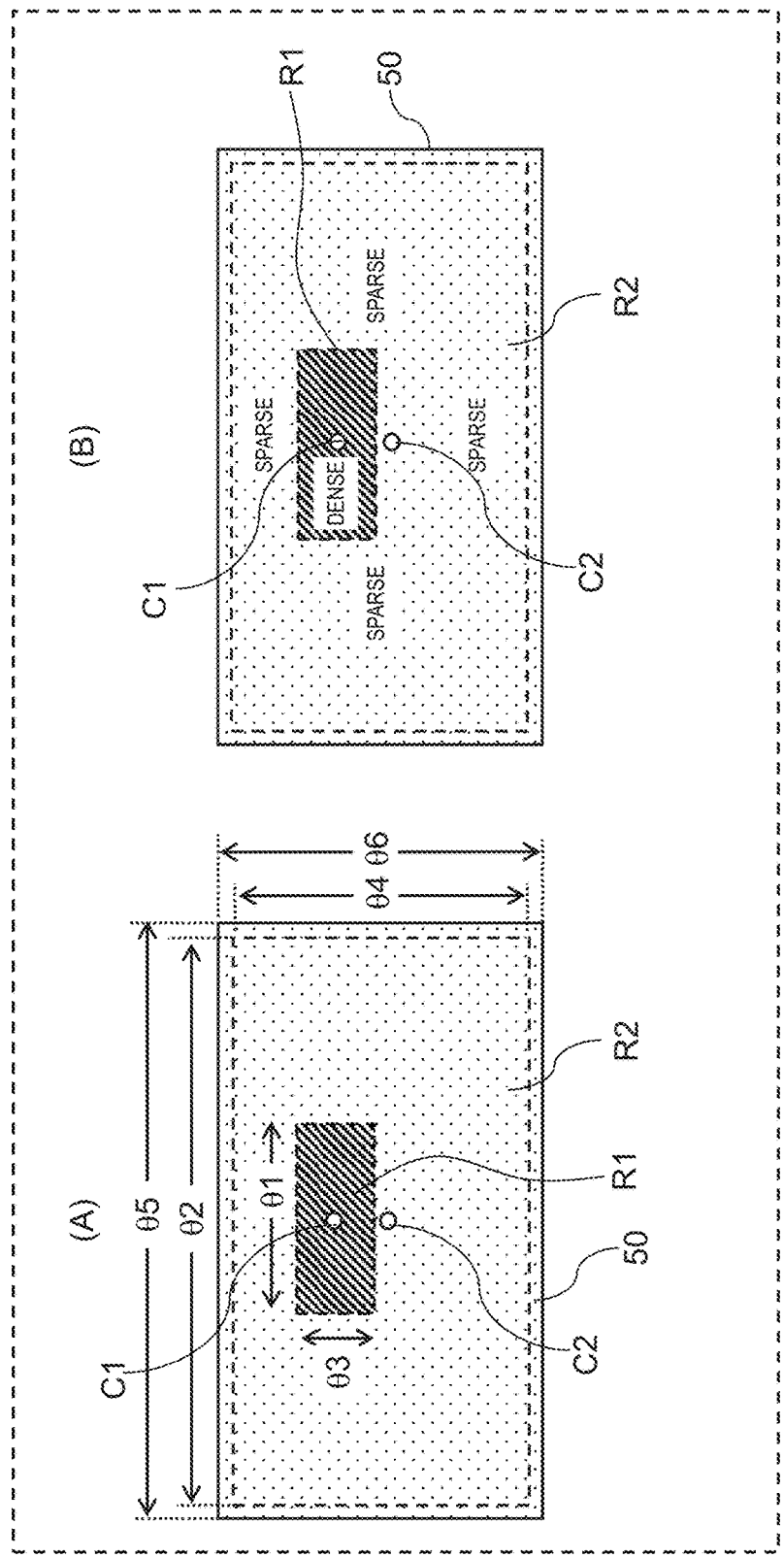
FIG. 3 is a view for describing a relationship between a captured image captured by the imaging device, an image displayed by an electronic room mirror, and a rearview image displayed by an in-vehicle display (Part (A)), and for describing resolution distribution of images formed on an imaging element via an optical system, according to the first exemplary embodiment (Part (B)).

Part (A) of FIG. 3 illustrates captured image 50 captured by imaging device 10. Captured image 50 includes first region R1 and second region R2. First region R1 is a region corresponding to an image displayed by electronic room mirror 30. Second region R2 is a region corresponding to a rear view image displayed by in-vehicle display 40. Center C1 of first region R1 is located slightly above center C2 of second region R2. Note that center C2 of second region R2 is set at a same position as a center of captured image 50, that is, a center of an imaging surface.

A view angle in a horizontal direction of first region R1 is θ1. For example, θ1 ranges from 40° to about 60° inclusive. A view angle in a vertical direction of first region R1 is θ3. θ3 ranges from about 15° to about 30° inclusive.

A view angle in a horizontal direction of second region R2 is θ2. For example, θ2 is about 150°. A view angle in a vertical direction of second region R2 is θ4. For example, θ4 is about 120°.

[1-1-2. Image Processing Device]

Figure 4:
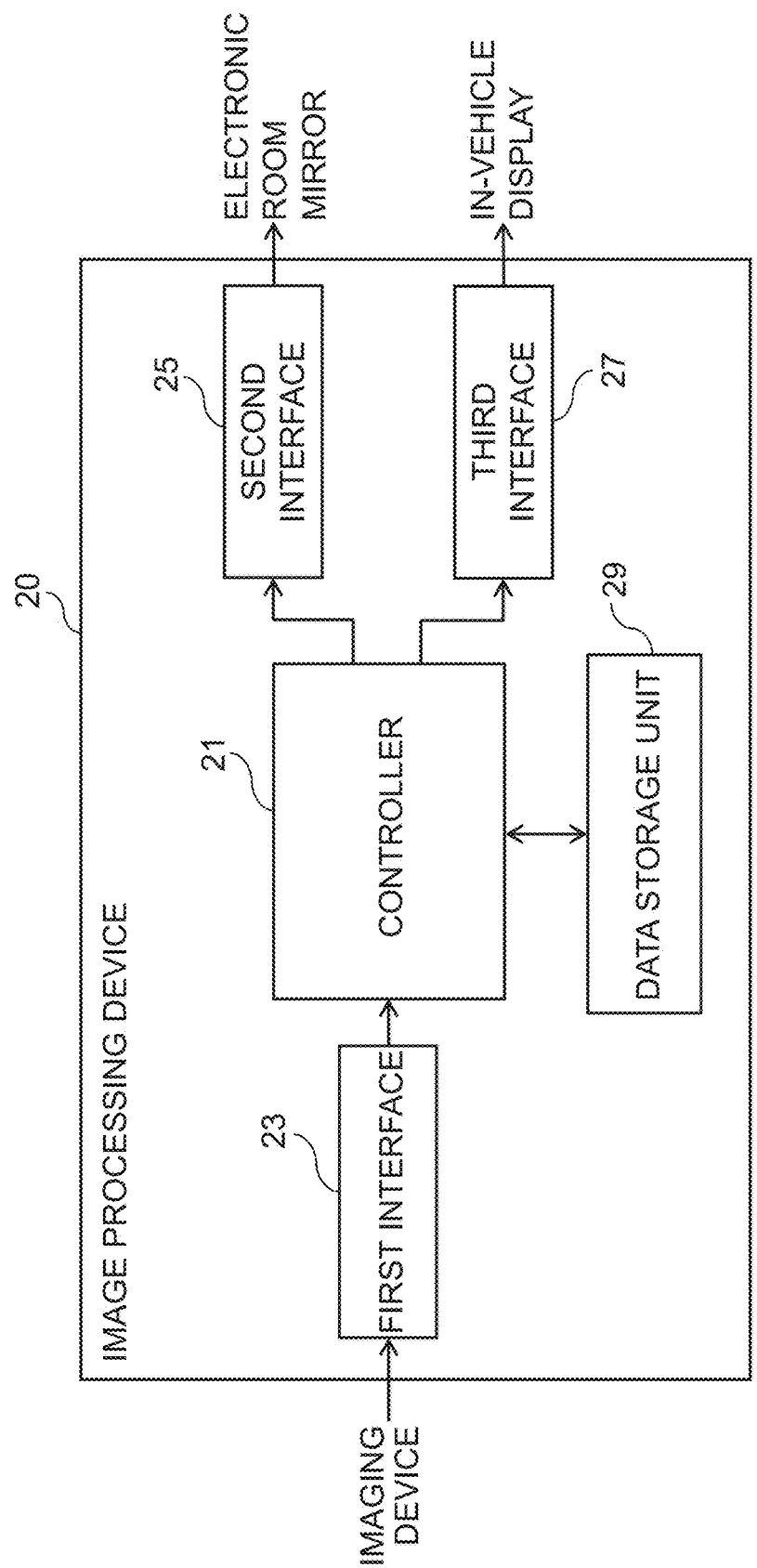
FIG. 4 is a diagram illustrating a configuration of an image processing device in the display system according to the first exemplary embodiment.

FIG. 4 is a diagram illustrating a configuration of image processing device 20 according to the first exemplary embodiment. Image processing device 20 includes first interface 23, controller 21, second interface 25, third interface 27, and data storage unit 29.

First interface 23 inputs image data from imaging device 10. Controller 21 performs predetermined image processing on the input image data and generates first and second image data. Second interface 25 transmits the first image data to electronic room mirror 30. Third interface 27 transmits the second image data to in-vehicle display 40. Storage unit 29 stores a program and the like executed by controller 21.

Controller 21 includes a central processing unit (CPU). Since controller 21 executes the program stored in data storage unit 29, image processing device 20 achieves a function described below. Controller 21 may include a dedicated hardware circuit. In other words, controller 21 may include the CPU, a micro processing unit (MPU), a field-programmable gate array (FPGA), a digital signal processor (DSP), or an application specific integrated circuit (ASIC), for example.

[1-1-3. Imaging Device]

Figure 5:
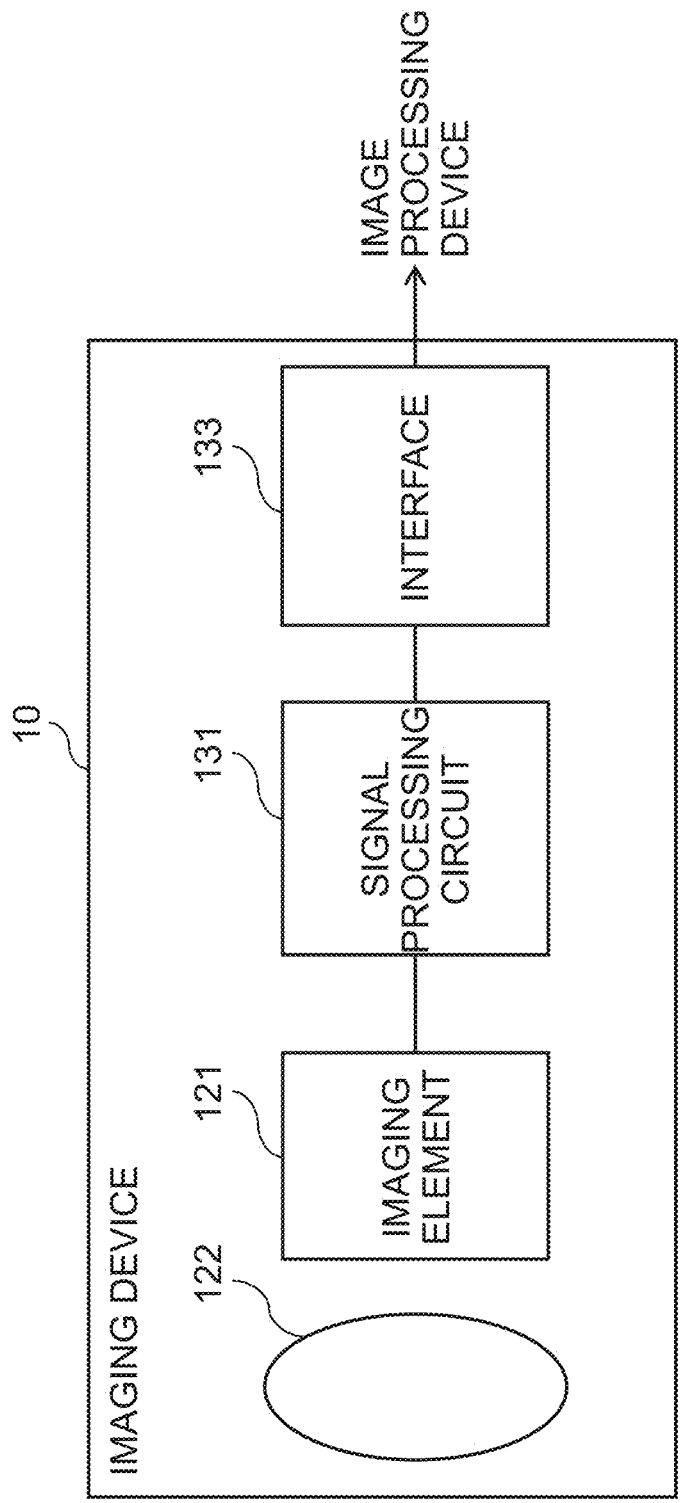
FIG. 5 is a diagram illustrating a configuration of an imaging device in the display system according to the first exemplary embodiment.

FIG. 5 is a diagram illustrating a configuration of imaging device 10 in display system 100 according to the first exemplary embodiment. Imaging device 10 is a camera that images a subject to generate image data. Imaging device 10 includes optical system 122, imaging element 121, signal processing circuit 131, and interface 133.

Optical system 122 in the first exemplary embodiment includes a free-form surface lens. Optical system 122 will be described below. Imaging element 121 captures a subject image formed by receiving light through optical system 122 and generates image data. Imaging element 121 has an imaging surface on which a subject image is formed. A plurality of pixels is arranged on the imaging surface in a two-dimensional manner, more specifically, in a matrix form. Imaging elements 121 is a charge coupled device (CCD) or complementary metal oxide semiconductor (CMOS) image sensor, for example. Signal processing circuit 131 performs predetermined image processing (for example, gamma correction and distortion correction) on the image data. Interface 133 outputs the image data that is signal-processed by signal processing circuit 131 to an external apparatus. Interface 133 may be realized by a circuit, for example.

[1-1-3-1. Optical System]

Figure 6:
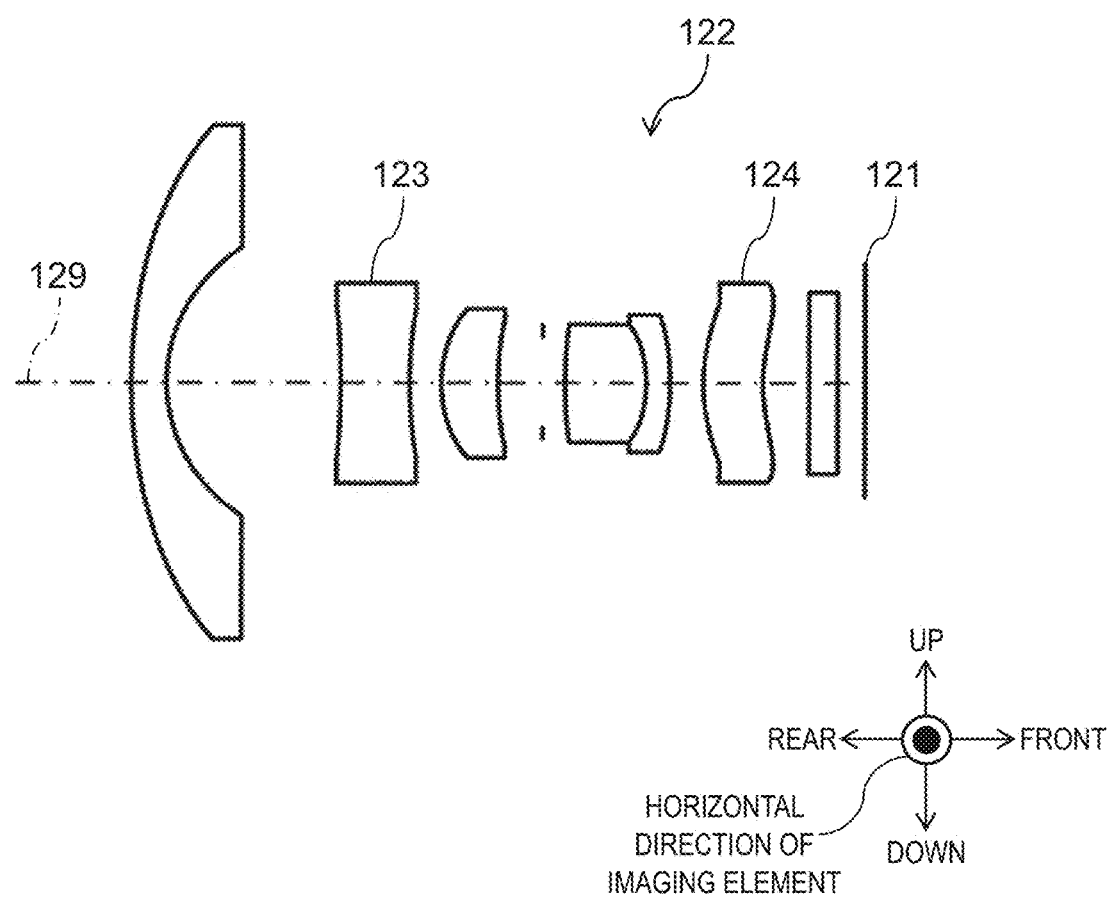
FIG. 6 is a view illustrating a configuration example of the optical system in the imaging device (a view as seen from a cross section when free-form surface lenses are virtually cut by a vertical plane including an optical axis) according to the first exemplary embodiment.

Optical system 122 is a unit for forming an image on the imaging surface of imaging element 121. Optical system 122 includes a lens, a diaphragm, and a filter, for example. FIG. 6 is a view illustrating an example of a configuration of optical system 122. FIG. 6 is a view as seen from a cross section when optical system 122 is virtually cut by a vertical plane including optical axis 129 (a plane in which a horizontal direction of the imaging element is a normal). Herein, optical axis 129 is a virtual line that passes through a center of the imaging surface of imaging element 121 and orthogonally intersects the imaging surface. Note that, when optical system 122 includes, for example, a mirror or a prism that reflects light, its optical axis is bent by the reflection. As illustrated in FIG. 6, optical system 122 includes a plurality of lenses. Optical system 122 in the first exemplary embodiment includes free-form surface lenses 123, 124, in particular.

The free-form surface lens is a lens in which a surface for refracting light to form an image has a non-arc shape and is not rotation symmetry. Note that a cylindrical lens is one type of an arc-shaped lens, which is different from the free-form surface lens. The free-form surface lens has the non-arc shape that is not a part of a perfect circle. Because of the above structure, the free-form surface lens can be designed so as to have optical characteristics that are not a concentric and are not vertically and horizontally symmetric. A material of the free-form surface lens includes, but is not particularly limited to, glass, resin, and the like. Examples of a method for manufacturing the free-form surface lens include, but are not particularly limited to, a method for molding the free-form surface lens by using a mold such as a metal mold. Note that a lens having optical characteristics of a concentric shape includes a spherical lens, an aspherical lens, and the like. Further, a lens having optical characteristics of vertical symmetry and horizontal symmetry (that is, rotation symmetry at 180 degrees) includes an anamorphic lens, a cylindrical lens, and the like. These lenses are different from the free-form surface lens.

In the first exemplary embodiment, a magnification ratio of an image formed by a view angle is different depending on a combination of free-form surface lens 123 and free-form surface lens 124. Particularly, in the first exemplary embodiment, as illustrated in part (A) of FIG. 3, free-form surface lenses 123, 124 are designed so that, in the image formed on the imaging surface (captured image 50), a magnification ratio of a region in a predetermined range above a center part (first region R1) is higher than a magnification ratio of the other region (second region R2). Further, optical system 122 including free-form surface lenses 123, 124 in the first exemplary embodiment has optical characteristics that are not concentric. Therefore, a view angle of optical system 122 is freely set without depending on an aspect of imaging element 121 to be used. Specifically, the view angle in the vertical direction is limited to minimum necessary and reduced positively, thereby increasing entire resolution.

As described above, in the first exemplary embodiment, by locally changing the magnification ratio of the image, resolution of the image in first region R1 becomes larger than resolution of the image in the other region (including second region R2) in captured image 50, as illustrated in part (B) of FIG. 3. In other words, pixels in first region R1 are arranged denser than pixels in second region R2. Note that "resolution of an image" will be described below.

Figure 7:
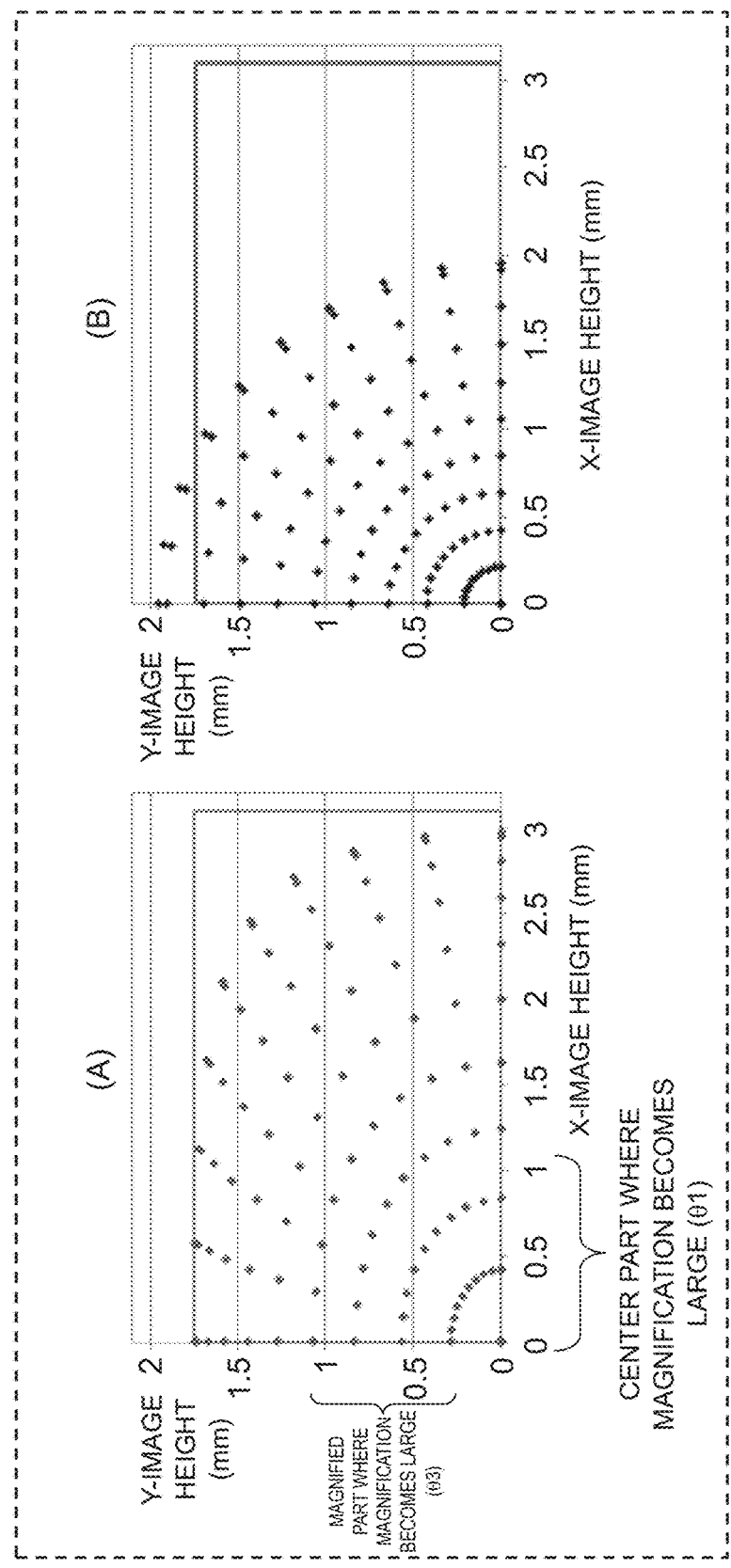
FIG. 7 is a graph illustrating a relationship between a view angle and an image point to the free-form surface lenses in the first exemplary embodiment (Part (A)), and illustrating a relationship between a view angle and an image point to a fisheye lens in a comparative example (Part (B)).

Part (A) of FIG. 7 is a graph illustrating a relationship between a view angle and an image point realized by optical system 122 including free-form surface lenses 123 and 124 in the first exemplary embodiment. Part (B) of FIG. 7 is a graph illustrating, as a comparative example, a relationship between a view angle and an image point to a fisheye lens that performs equidistant projection. Note that each of parts (A), (B) of FIG. 7 illustrates a relationship between a view angle and an image point in a first quadrant of an imaging surface with an optical axis as the center. Each of other quadrants has a relationship that is line symmetrical with the first quadrant with respect to a vertical axis or a horizontal axis.

In each of parts (A), (B) of FIG. 7, the image point is plotted every 10° of the view angle in a horizontal direction and a vertical direction of the imaging surface. As illustrated in part (A) of FIG. 7, when optical system 122 including free-form surface lenses 123, 124 in the first exemplary embodiment is used, as dot is closer to the optical axis, that is, as a view angle in a horizontal direction is smaller, an interval between dots in the horizontal direction of a formed image increases. This means that in the horizontal direction, as the view angle is smaller, that is, as a distance to a center of the image is smaller, the image is more magnified and formed.

Meanwhile, as illustrated in part (A) of FIG. 7, in free-form surface lenses 123, 124 in the first exemplary embodiment, as a view angle in a vertical direction is closer to a part slightly above the center of the optical axis, an interval between dots in the vertical direction increases. This means that in the vertical direction, as the view angle is closer to the part slightly above the center of the captured image, the image is more magnified and formed.

In contrast, as illustrated in part (B) of FIG. 7, the fisheye lens in the comparative example has no conspicuous change in a magnification ratio of an image regardless of the view angle in the horizontal direction and the vertical direction.

Figure 8:
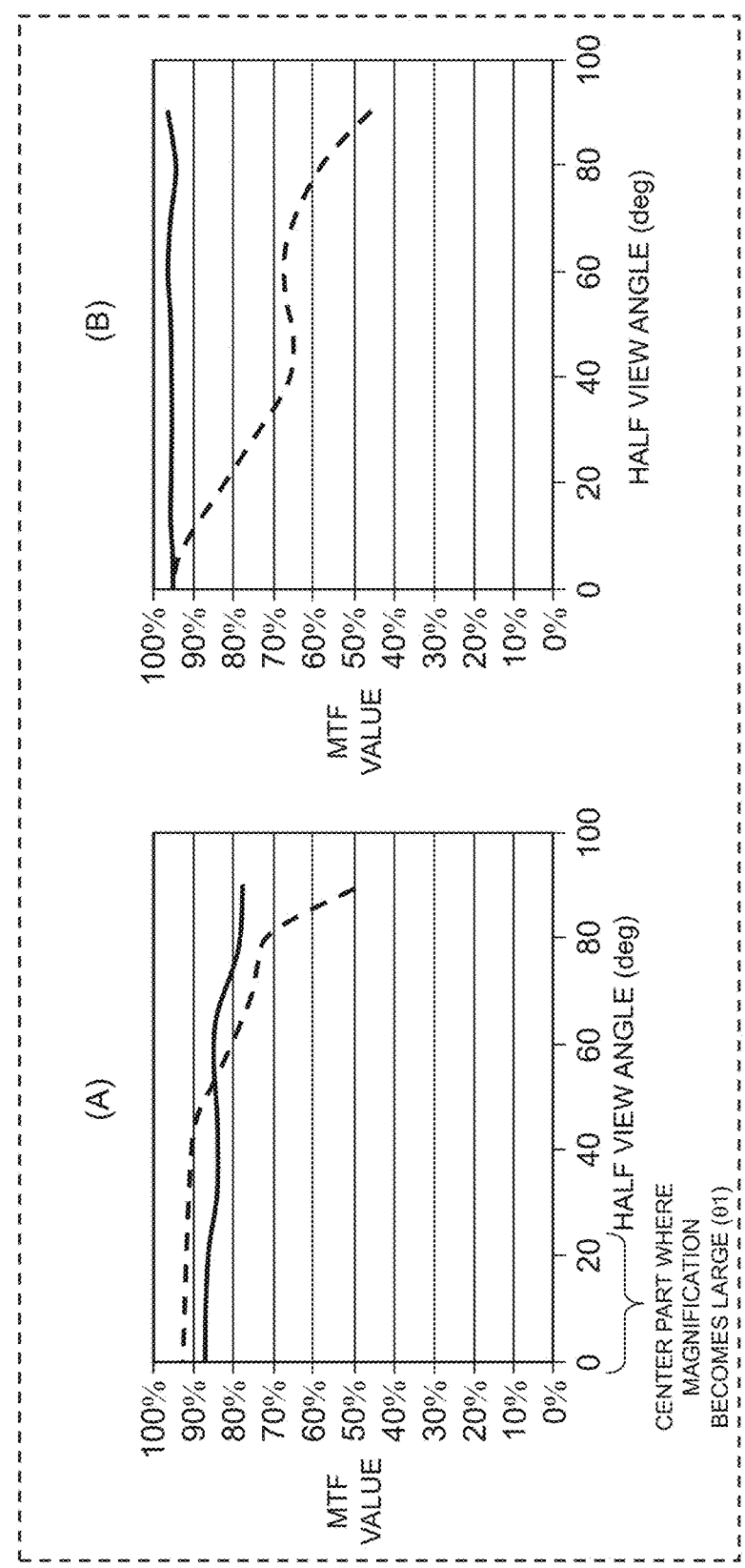
FIG. 8 is a graph illustrating MTF characteristics of the free-form surface lenses in the first exemplary embodiment (Part (A)), and illustrating MTF characteristics of the rotationally symmetric fisheye lens in the comparative example (Part (B)).

Part (A) of FIG. 8 illustrates modulation transfer function (MTF) characteristics realized by optical system 122 including free-form surface lenses 123, 124. Part (B) of FIG. 8 illustrates, as a comparative example, MTF characteristics to a fisheye lens that performs equidistant projection. An evaluation frequency is basically 51 Lp/mm and is varied according to a magnification ratio. In part (A), (B) of FIG. 8, a solid line indicates characteristics in a sagittal (concentric) direction, and a broken line indicates characteristics in a meridional (radial) direction. As illustrated in part (A) of FIG. 8, an MTF value in a region having a low view angle is higher than an MTF value in a region having a high view angle. Further, it is found from parts (A), (B) of FIG. 8 that optical system 122 including free-form surface lenses 123, 124 in the first exemplary embodiment can obtain better MTF values than the fisheye lens in the comparative example in the meridional direction over a wide range (particularly in a region having a large view angle).

Optical system 122 including free-form surface lenses 123, 124 is designed so as to have the optical characteristics described above. Therefore, as illustrated in part (B) of FIG. 3, in captured image 50 generated by imaging element 121, the resolution of the image formed in first region R1 can be set larger (that is, denser) than the resolution of the image formed in the other region (for example, second region R2).

The resolution of the image herein is defined as a number of pixels in imaging element 121 used to capture an image in a unit view angle formed on imaging element 121 through optical system 122 (refer to Formula (1) below).

$$\text{Resolution} = \text{number of pixels required to capture image with predetermined view angle}/\text{predetermined view angle} \quad (1)$$

Figure 9:
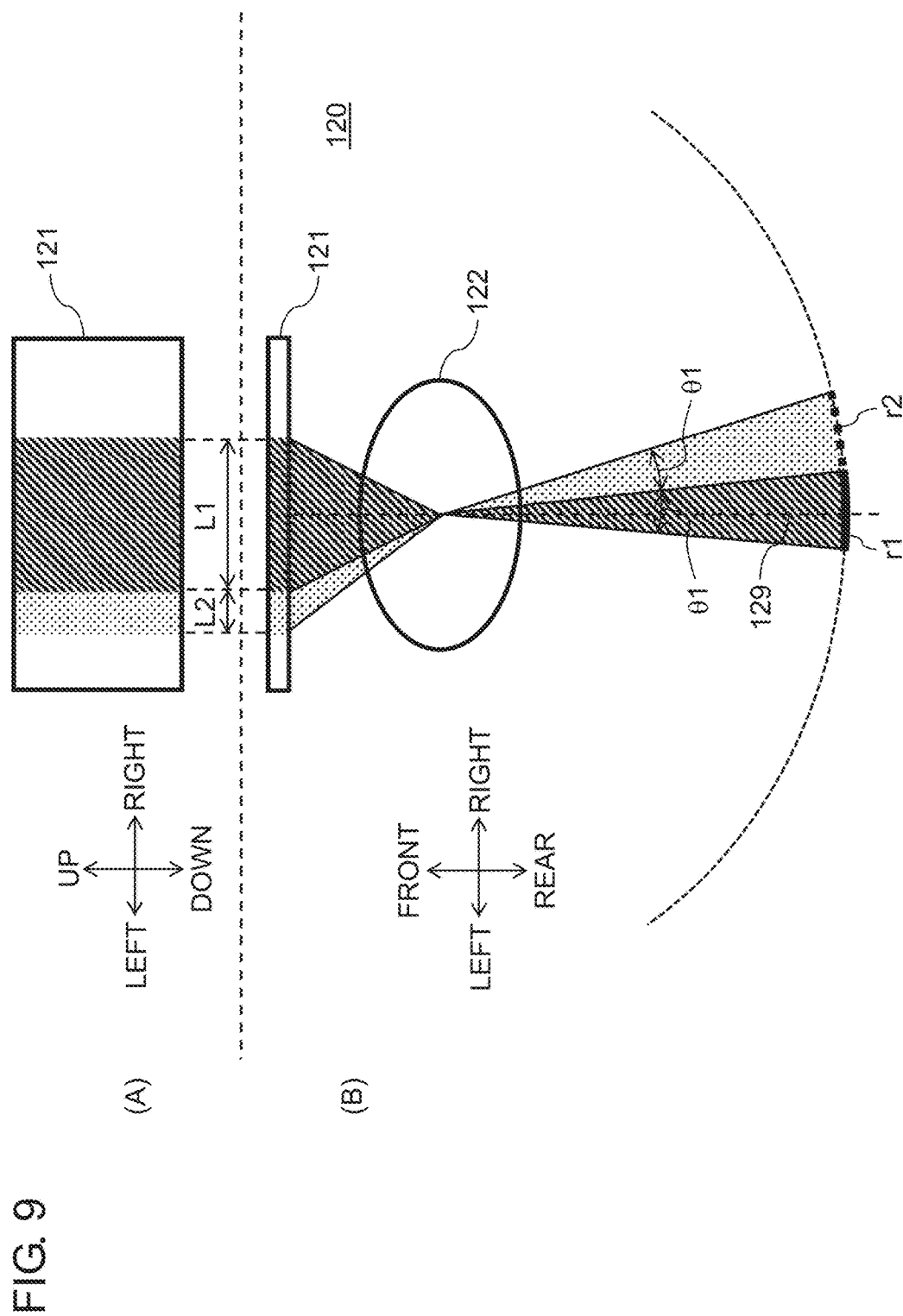
FIG. 9 is a view for describing resolutions of the images formed on the imaging element by the optical system according to the first exemplary embodiment.

With reference to FIG. 9, the resolution of the image will be concretely described. As illustrated in FIG. 9, it is considered that a subject image in first region r1 in a range of view angle θ1 including optical axis 129 and a subject image in second region r2 having identical view angle θ1 adjacent to region r1 are formed onto imaging element 121 through optical system 122. The resolution in the horizontal direction is considered herein to simplify the description. First region r1 corresponds to first region R1 in FIG. 2. Second region r2 corresponds to second region R2 in FIG. 2. Part (B) of FIG. 9 is a view schematically describing an image-forming state on imaging element 121 virtually taken in a horizontal plane including the optical axis. Part (A) of FIG. 9 is a view schematically describing a state of an image formed on the imaging surface of imaging element 121.

As described above, optical system 122 in the first exemplary embodiment is designed so that a magnification ratio (M1) of first region r1 is higher than a magnification ratio (M2) of the other region. Therefore, when imaging element 121 images a subject in first region r1 including a center part (the optical axis) through optical system 122, the image in first region r1 is formed on the imaging surface while being magnified with magnification ratio M1, as illustrated in FIG. 9. A length of the image in first region r1 formed on the imaging surface at this time is indicated by L1. When imaging element 121 images a subject in second region r2 separated from the center part (the optical axis) in the horizontal direction, the image is formed on the imaging surface while being magnified with magnification ratio M2 that is lower than magnification ratio M1 at the center part. Therefore, length L2 of the image in second region r2 on the imaging surface is smaller than length L1 of the image in first region r1.

On imaging element 121 in the first exemplary embodiment, the pixels are arranged at equal intervals in a two-dimensional manner. Therefore, with an increase in length of an image in a horizontal direction, a number of pixels required to capture the image increases more. In other words, number N1 of pixels required to capture the image in first region r1 having length L1 is larger than number N2 of pixels required to capture the image in second region r2 having length L2 (<L1). Note that, as described above, the view angle of first region r1 and the view angle of second region r2 are equal (θ1).

Accordingly, resolution of the image for first region r1 (=N1/θ1) (a number of pixels per unit view angle) is higher than resolution of the image for second region r2 (=N2/θ1). Similarly, resolution of the image in first region R1 is higher than resolution of the image in second region R2.

Note that, an expression of different resolutions in this exemplary embodiment means a difference in resolutions, which is produced by a combination of an optical system (for example, an optical system including an ordinary rotationally symmetric spherical lens and an aspherical lens) and a planer imaging element.

As described above, the magnification ratio is different according to the view angle of optical system 122 (free-form surface lenses 123, 124) in the first exemplary embodiment. As a result, the resolution of the image formed on the imaging surface of imaging element 121 is different according to the view angle (that is, the region of the image). Specifically, as illustrated in part (B) of FIG. 3, in the image formed on the imaging surface (captured image 50), the resolution of first region R1 corresponding to view angle θ1 in the horizontal direction and view angle θ3 in the vertical direction is higher than the resolution of the region other than first region R1.

[1-2. Operation]

An operation of display system 100 configured as described above will be described below.

Display system 100 in the first exemplary embodiment is installed within vehicle 200. In display system 100, imaging device 10 captures an image behind the vehicle. Image processing device 20 in FIG. 4 receives image data (a moving image) generated by imaging device 10 via first interface 23.

Image processing device 20 (controller 21) generates an image for displaying on electronic room mirror 30 and in-vehicle display 40 in FIG. 1 from captured image 50 (see FIG. 3) captured by imaging device 10 and subjected to predetermined image processing (for example, calibration including gamma correction and distortion correction).

Figure 10:
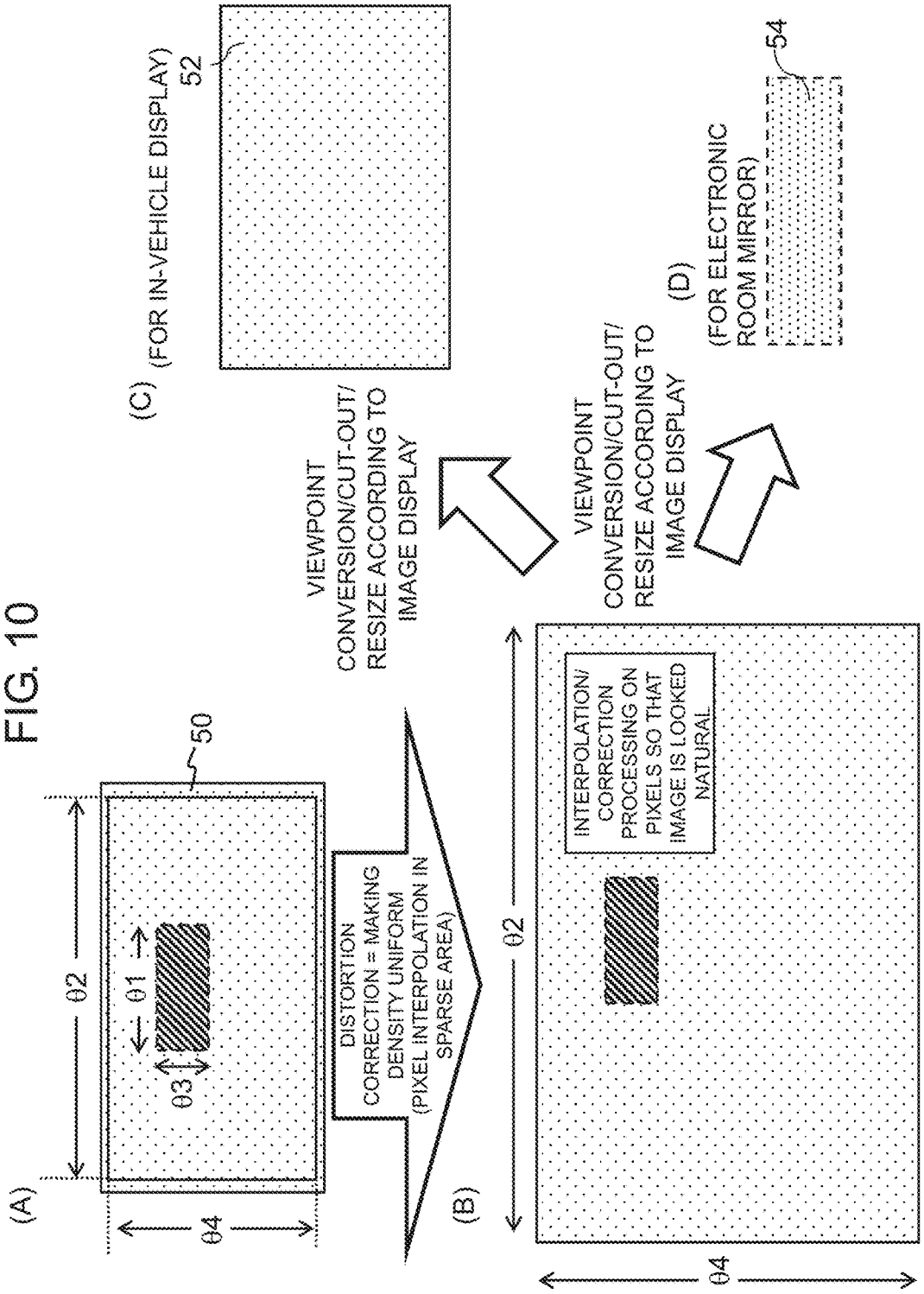
FIG. 10 is a view for describing a method for forming images displayed on the electronic room mirror and the in-vehicle display according to the first exemplary embodiment.

Specifically, as illustrated in parts (A), (B) of FIG. 10, image processing device 20 (controller 21) performs image processing on captured image 50, thereby making density of pixels uniform. In other words, image processing device 20 (controller 21) interpolates pixels in a region where pixels are sparse. Furthermore, as illustrated in part (B) of FIG. 10, image processing device 20 (controller 21) performs distortion correction processing on captured image 50 so that the image looks natural. Note that, in the first exemplary embodiment, in a state after the interpolation in part (B) of FIG. 10, for example, imaging system 70 of the present disclosure is configured in a condition in which a number of pixels is from about 1.7 times to about 1.8 times, as compared with a state before the interpolation in part (A) of FIG. 10.

Furthermore, as illustrated in part (D) of FIG. 10, image processing device 20 cuts out an image in region R1 at the center part (horizontal view angle θ1, vertical view angle θ3) from captured image 50. At this time, image processing device 20 converts a viewpoint of the image in first region R1 so that the image in first region R1 becomes an image when a person horizontally sees a scene directly behind vehicle 200 from a driver's seat. Then, image processing device 20 resizes the cut-out image to a size suitable for display on electronic room mirror 30 and generates image 54 (an example of a first image) for display on electronic room mirror 30. Image 54 is transmitted to electronic room mirror 30 via second interface 25 in FIG. 4. Electronic room mirror 30 receives to display data of image 54 from image processing device 20. Herein, in region R1 at the center part in captured image 50, an image having high resolution is generated through optical system 122. Accordingly, image 54 becomes an image having high resolution suitable for an image for a room mirror.

Furthermore, as illustrated in part (C) of FIG. 10, image processing device 20 cuts out an image in second region R2 (horizontal view angle θ2, vertical view angle θ4) from captured image 50. At this time, image processing device 20 converts a viewpoint of the image in second region R2 as needed so that the image in second region R2 becomes an image when a person sees a little obliquely downward side from directly behind vehicle 200. Then, image processing device 20 resizes the cut-out image to a size suitable for display on in-vehicle display 40 to generate image 52 (an example of a second image). Image 52 is transmitted to in-vehicle display 40 via third interface 27 in FIG. 4. In this way, image 52 displayed as a rear view image is generated. In-vehicle display 40 receives to display data of image 52 from image processing device 20. With this configuration, a wide angle image of a scene behind the vehicle is displayed on in-vehicle display 40.

Figure 11:
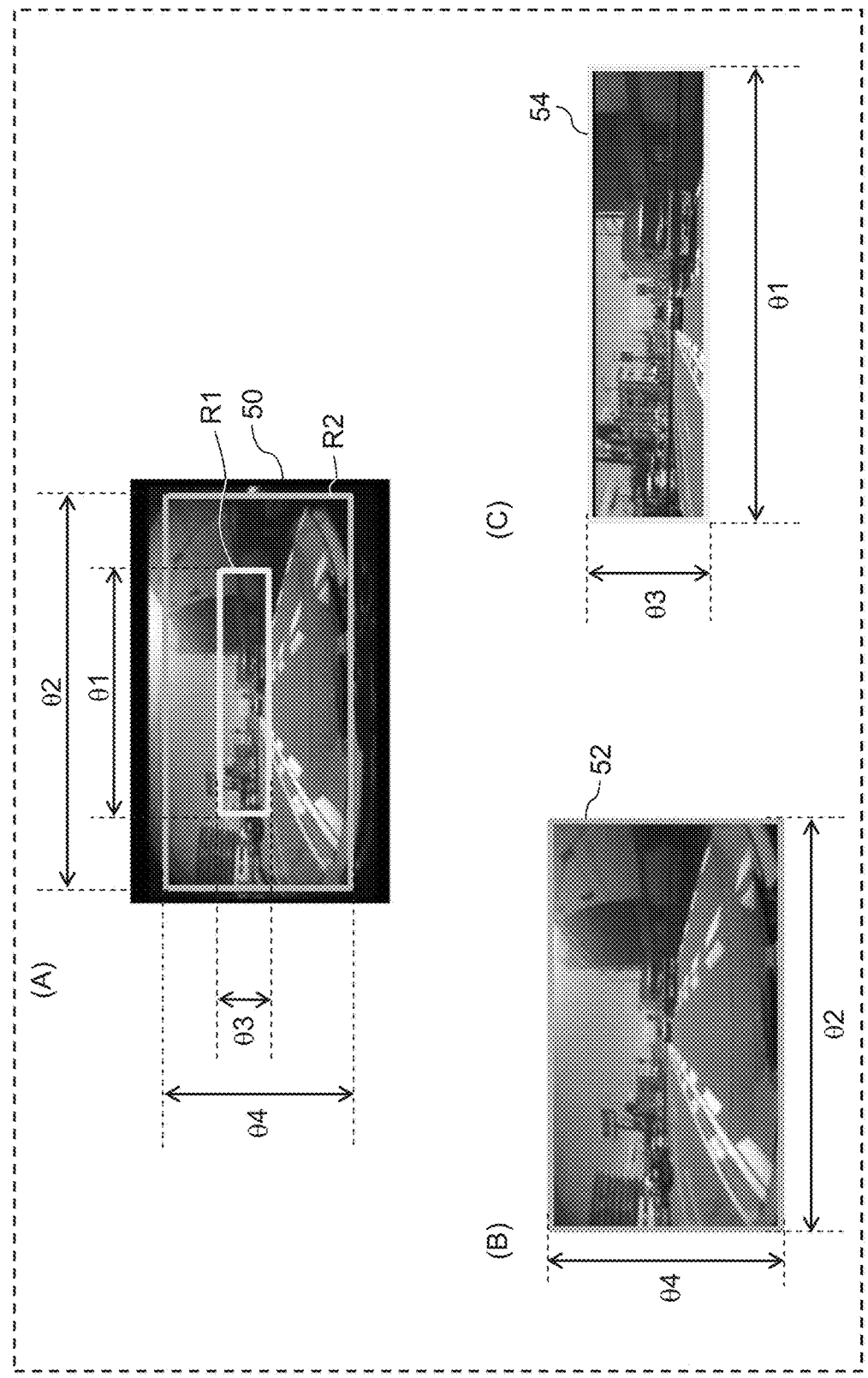
FIG. 11 is a view for describing the captured image (Part (A)), for describing the image displayed on the in-vehicle display (Part (B)), and for describing the image displayed on the electronic room mirror, according to the first exemplary embodiment (Part (C)).

FIG. 11 is a view illustrating an example of an actual image. When captured image 50 illustrated in part (A) of FIG. 11 is generated by imaging device 10, image 54 illustrated in part (C) of FIG. 11 and generated from first region R1 of captured image 50 is displayed on electronic room mirror 30. Rear view image 52 illustrated in part (B) of FIG. 11 and generated from second region R2 illustrated in part (A) of FIG. 11 is displayed on in-vehicle display 40.

Figure 12:
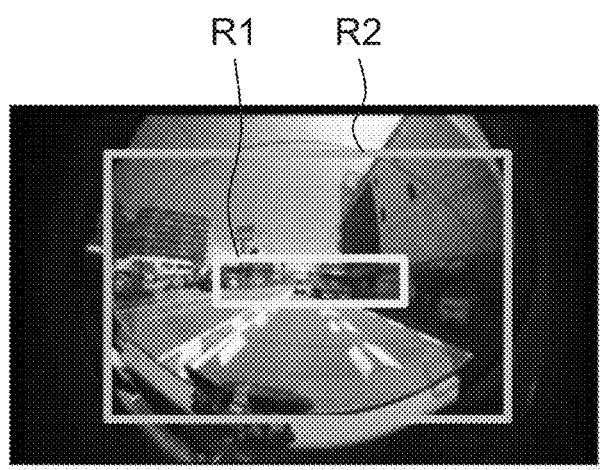
FIG. 12 is a view illustrating a captured image when the fisheye lens in the comparative example is used.

Note that FIG. 12 illustrates a captured image in a comparative example of the first exemplary embodiment. In the comparative example in FIG. 12, a captured image is provided when optical system 122 using free-form surface lenses 123, 124 is changed to an optical system using an ordinary rotationally symmetric fisheye lens instead of the free-form surface lens. In the optical system using the rotationally symmetric fisheye lens, the optical characteristics change concentrically. Therefore, horizontal/vertical view angles are determined depending on an aspect of imaging element 121. Accordingly, an image cannot be formed on the entire imaging element to obtain a necessary view angle, and imaging element 121 cannot be effectively utilized. As a result, each of first region R1 and second region R2 obtains an image with low resolution. Further, as illustrated in part (B) of FIG. 8, the optical characteristics of the fisheye lens in the comparative example are most excellent at a center of captured image 50. In other words, it is necessary that a center of first region R1 and the center of the captured image coincide with each other to enhance image quality of first region R1.

In other words, in the first exemplary embodiment, the center of first region R1 can be deviated from the center of captured image 50 (and second region R2), and pixels in first region R1 can be denser than pixels in second region R2, as compared with the rotationally symmetric fisheye lens.

As above, according to display system 100 in the first exemplary embodiment, one imaging device can generate two kinds of images having different view angles and image resolutions. With this configuration, in the first exemplary embodiment, one imaging device can display a clear image having high resolution on electronic room mirror 30 and can display a wide angle image on in-vehicle display 40. The display system with a simple configuration can be realized.

[1-3. Characteristics]

FIG. 14 is a table for comparing characteristics of the display systems in a conventional example, the comparative example, and the first exemplary embodiment. FIG. 14 illustrates, using resolution of an electronic room mirror in the conventional example as a reference, characteristics of an imaging element and a lens necessary to satisfy this reference.

The display system in the "conventional example" illustrated in FIG. 14 is a conventionally disclosed display system and is an example in which an image for electronic room mirror 30 and an image for in-vehicle display 40 are respectively obtained by using two cameras. Each of the cameras includes an imaging element and an optical system.

In the conventional example in FIG. 14, imaging elements of the respective cameras are the same. A number of pixels of the imaging element is about 1.3 M, and this imaging element satisfies reliability as an in-vehicle use. Further, in the camera for electronic room mirror 30 in the conventional example in FIG. 14, a lens of an optical system is a normal, that is, ordinary rotation symmetry lens. Note that the rotation symmetry lens is different from a free-form surface lens. Further, in the camera for in-vehicle display 40 in the conventional example, a lens of an optical system is also a normal rotation symmetry lens. More specifically, the lens is a fisheye lens. Note that, in FIG. 14, a "electronic room mirror cut-out area optical magnification" column displays a reference value of an optical magnification (a magnification ratio of light) of an image for the electronic room mirror relative to an image for in-vehicle display 40 in the conventional example. Therefore, the optical magnification in the conventional example in FIG. 14 is set at 1.0 times.

In the image for electronic room mirror 30 in the conventional example in FIG. 14, a view angle in a horizontal direction is about 80°, and a view angle in a vertical direction is about 60°. Further, in the image for in-vehicle display 40 in the conventional example, a view angle in the horizontal direction is about 200°, and a view angle in the vertical direction is about 150°. Resolution of the image for electronic room mirror 30 in the above-described conditions is used as a reference.

Meanwhile, in the display system in the comparative example, one camera is provided. In other words, in the comparative example, an image for electronic room mirror 30 and an image for in-vehicle display 40 are obtained from an image obtained by one camera, as with the first exemplary embodiment.

In the display system in the comparative example, a number of pixels of an imaging element must be 8.0 M or more. Further, a lens in the comparative example is a rotation symmetry lens, specifically, a fisheye lens.

An optical magnification in a region of the image for electronic room mirror 30 (first region R1) is 1.0 times. In other words, the optical magnification is the same as the optical magnification in the conventional example. Further, view angles in a region of the image for in-vehicle display 40 (second region R2) are the same as the view angles in the conventional example.

Since the display system in the comparative example does not use a free-form surface lens as the lens, an optical magnification in a region of the image for electronic room mirror 30 (first region R1) is 1.0 times. Therefore, it is necessary that an imaging element having pixels higher than the pixels in the conventional example is used to make resolution of first region R1 equal to the reference. Herein, the display system is required to have high reliability because of the in-vehicle use. It is technically difficult and costly to realize the imaging element having high reliability and high pixels.

In contrast, in the first exemplary embodiment, the free-form surface lens is used for optical system 122. Therefore, an optical magnification of first region R1 is 1.5 times or more and is larger than the optical magnification in the comparative example. Accordingly, even when a number of pixels of an imaging element is relatively low, resolution of first region R1 can be made almost equal to the reference. Use of the imaging element having the low number of pixels is beneficial to improve reliability. Further, the use is also beneficial to reduce cost.

Further, since high pixels can be locally realized by the lenses, it is not necessary to use a method for locally changing the pixel itself of the imaging element. Therefore, image quality is easily stabilized. Further, in the method for locally changing the pixel itself of the imaging element, it is necessary to expand a size of the imaging element to secure performance in a dark place. As a result, the size of an optical system may become large, and cost may also increase. In contrast, in the present exemplary embodiment, an increase in the size of the optical system can be suppressed. Further, in the present exemplary embodiment, an increase in cost can be suppressed.

[1-4. Effects and Others]

As above, imaging system 70 in the first exemplary embodiment is imaging system 70 disposed at a rear part of an automobile (a moving body). Imaging system 70 includes imaging device 10 and image processing device 20. Imaging device 10 includes imaging element 121 and optical system 122. Imaging element 121 has a plurality of pixels arranged in a two-dimensional manner and is configured to generate image data. Optical system 122 is configured to form a subject image on an imaging surface of imaging element 121. Image processing device 20 is configured to generate a captured image based on the image data. The imaging surface of imaging element 121 includes first region R1 corresponding to a first view angle and second region R2 corresponding to a second view angle that is larger than the first view angle. On the imaging surface, when a number of pixels per unit view angle of the plurality of pixels is defined as resolution, optical system 122 is configured so that resolution of first region R1 is higher than resolution of second region R2 excluding the first region. Further, a center of first region R1 is disposed at a position deviated from a center of the imaging surface.

Further, display system 100 in the first exemplary embodiment includes imaging system 70 and at least one of electronic room mirror 30 (an example of a first display apparatus) that displays first image 54 and in-vehicle display 40 (an example of a second display apparatus) that displays second image 52.

In the above-described configuration, imaging device 10 can generate captured image 50 having different resolutions of a subject image. By cutting out a part having high resolution in such captured image 50, imaging system 70 can generate an image with sufficient resolution. Hence, a plurality of images having different view angles (a captured image of an original size and a cut-out image) can be obtained from captured image 50. With this configuration, in display system 100, only one imaging device needs to be prepared to obtain images having a plurality of resolutions, and a configuration of display system 100 can be simplified.

Further, the first view angle is a view angle including a center (an optical axis) of imaging element 121. The second view angle is larger than the first view angle. Resolution of a region of the imaging surface corresponding to the first view angle is higher than resolution of a region of the imaging surface corresponding to the second view angle. With this configuration, first image 54 having high resolution and wide angle second image 52 can be obtained. Note that both the first view angle and the second view angle may be view angles in a horizontal direction, may be view angles in a vertical direction, or may be view angles in the horizontal direction and the vertical direction.

Further, center C1 of first region R1 is disposed at the position deviated from the center of the imaging surface. In other words, an image in first region R1 can be, for example, an image directed toward the horizontal direction, and an image in second region R2 can be, for example, an image directed obliquely downward so as to include rear bumper 201. Therefore, an image according to a use of each display apparatus can be obtained from one image. Note that the position deviated from the center may be a position deviated from the center in the horizontal direction, may be a position deviated from the center in the vertical direction, or may be a position deviated from the center in the horizontal direction and the vertical direction.

Further, in the first exemplary embodiment, optical system 122 is designed so that a magnification ratio of light that forms an image in first region R1 is larger than a magnification ratio of light that forms an image in second region R2 excluding the first region. With this configuration, resolution of first region R1 is higher than resolution of second region R2 excluding the first region.

Further, in the first exemplary embodiment, optical system 122 includes free-form surface lenses 123, 124. Use of the free-form surface lenses enables free design of the magnification ratio in a desired region of the imaging surface.

Further, in the first exemplary embodiment, the first display apparatus (electronic room mirror 30) that displays first image 54 and the second display apparatus (in-vehicle display 40) that displays second image 52 are included. With this configuration, a high quality image can be projected on electronic room mirror 30, and a wide angle image can be projected on the in-vehicle display.

Further, in the first exemplary embodiment, electronic room mirror 30 serving as the first display apparatus displays the first image while the automobile serving as the moving body is moving. With this configuration, in the first exemplary embodiment, a high quality image can be projected on electronic room mirror 30 during driving.

Further, in the first exemplary embodiment, in-vehicle display 40 serving as the second display apparatus displays the second image when the moving body moves backwards. With this configuration, in the first exemplary embodiment, a user can utilize in-vehicle display 40 as a rear view monitor and easily confirm a rear side when parking the automobile in a garage, for example.

Other Exemplary Embodiments

The first exemplary embodiment has been described above as an example of the technique disclosed in the present application. However, the technique in the present disclosure is not limited to this, and can also be applied to exemplary embodiments having undergone changes, replacements, additions, omissions, and the like as appropriate. In addition, new exemplary embodiments can be made by combining constituent elements described in the above first exemplary embodiment. Therefore, other exemplary embodiments will be described below.

Figure 15:
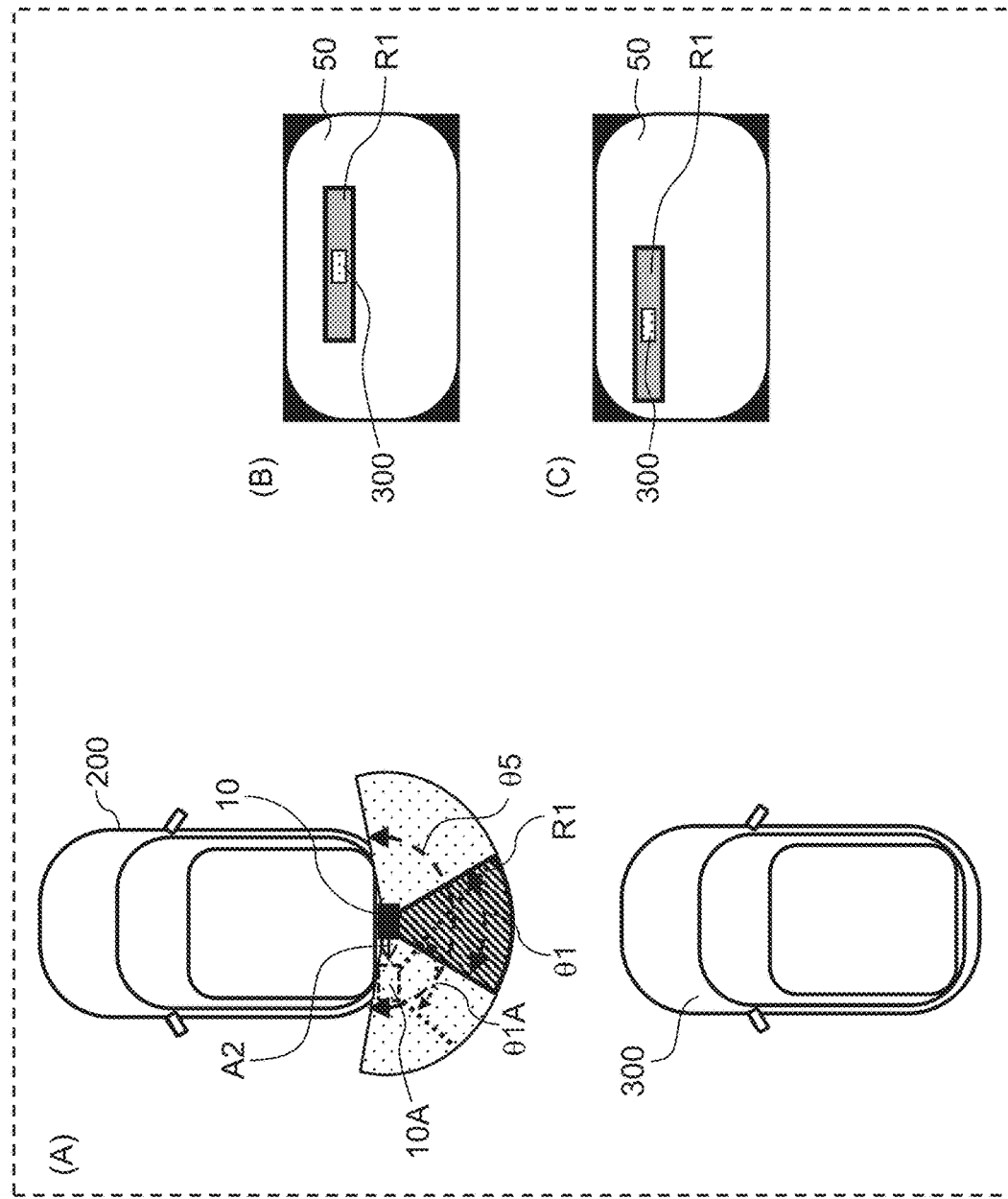
FIG. 15 is a view for describing a relationship between a mounting position of an imaging device and a captured image according to another exemplary embodiment.

In the first exemplary embodiment, as illustrated in FIG. 2, imaging device 10 is disposed at the center on the rear side of vehicle 200. However, as illustrated in part (A) of FIG. 15, imaging device 10A may be disposed at a position deviated in a horizontal direction from a center on a rear side of vehicle 200. In this case, in the first exemplary embodiment, the center of first region R1 is not deviated in the horizontal direction from the center of the imaging surface, as illustrated in part (B) of FIG. 15. In contrast, as illustrated in part (C) of FIG. 15, a center of first region R1 is deviated not only in a vertical direction but also in a horizontal direction from a center of an imaging surface. Note that, when a free-form surface lens is used, a magnification ratio of a view angle can be freely designed not only in the vertical direction but also in the horizontal direction.

Herein, view angle θ1 corresponding to first region R1 of each of imaging device 10 in the first exemplary embodiment and imaging device 10A is additionally described. Normally, it is considered that a main part of a subject projected on an electronic room mirror is rear vehicle 300, as illustrated in part (A) of FIG. 15. Therefore, when imaging device 10A is disposed at any position, a view angle in the horizontal direction is determined so that rear vehicle 300 is reliably projected. Therefore, when the position of imaging device 10A is not so much deviated in the horizontal direction from the center of the vehicle, view angle θ1A of imaging device 10A may be the same as view angle θ1 of imaging device 10. Further, when the position of imaging device 10A is greatly deviated in the horizontal direction from the center of the vehicle, view angle θ1A of imaging device 10A may be larger than view angle θ1 of imaging device 10.

Further, in the above-described first exemplary embodiment, the electronic room mirror and the in-vehicle display are described as an example of the display apparatus. However, a type of display apparatus is not limited to these electronic room mirror and in-vehicle display. An idea of the present disclosure can be adopted to display systems that use various types of display apparatuses according to uses (for example, a head-up display).

In the above-described exemplary embodiment, images 54, 52 having different view angles are respectively displayed on separate display apparatuses 30, 40. However, the images may be displayed on an identical display apparatus simultaneously or selectively. In other words, images 54, 52 may be displayed on at least one of the display apparatuses.

In the above-described exemplary embodiment, imaging device 10 is disposed so as to capture the image of the scene behind the vehicle, but imaging device 10 may be disposed so as to capture an image of a front scene or a side scene of the vehicle.

In the above-described exemplary embodiment, imaging device 10 performs the gamma correction and the distortion correction on the images. However, image processing device 20 may perform these processing. Alternatively, imaging device 10 may perform the gamma correction, and image processing device 20 may perform the distortion correction.

In the above-described exemplary embodiment, the example in which display system 100 is applied to vehicle (automobile) 200 has been described. However, display system 100 may be applied to another moving body (a train, a vessel, an airplane, a robot, a robot arm, a drone, or the like) in addition to the automobile. Alternatively, display system 100 or imaging device 10 may be applied to a monitoring camera and a medical device for a surgical operation.

In the above-described exemplary embodiment, only one cut-out region in captured image 50 is set, but a plurality of cut-out regions may be set. In this case, optical characteristics of the optical system (that is, the free-form surface lenses) may be designed so that desired resolution (magnification ratio) is obtained in each of the cut-out regions (view angles).

As described above, the exemplary embodiments have been described as examples of the technique according to the present disclosure. The accompanying drawings and the detailed description have been provided for this purpose.

Accordingly, the constituent elements described in the accompanying drawings and the detailed description may include not only constituent elements that are essential to solve the problem but also constituent elements that are provided as examples used to exemplify the technique and are not essential to solve the problem. It should not be therefore determined that the unessential constituent elements in the accompanying drawings and the detailed description are essential only based on the fact that these constituent elements are included in the drawings and the detailed description.

Furthermore, since the exemplary embodiments described above are intended to illustrate the technique in the present disclosure, various changes, substitutions, additions, omissions, and the like can be made within the scope of the claims and the scope of equivalents thereof.

INDUSTRIAL APPLICABILITY

According to a system of the present disclosure, one imaging device can provide images with a plurality of view angles including an image having high resolution, and the system can be applied to various uses (an imaging system or a display system in a moving body, a monitoring camera, or the like).

The invention claimed is:

1. An imaging system disposed at a rear part of a moving body, the imaging system comprising:
    an imaging device including an imaging element and an optical system, the imaging element having a plurality of pixels arranged in a two-dimensional manner and generating image data, the optical system forming a subject image on an imaging surface of the imaging element; and
    an image processing device configured to generate a captured image based on the image data,
    wherein the imaging surface includes a first region corresponding to a first view angle and a second region corresponding to a second view angle that is larger than the first view angle,
    on the imaging surface, when a number of pixels per unit view angle of the plurality of pixels is defined as resolution, the optical system is configured so that the resolution of the first region is higher than the resolution of the second region excluding the first region, and
    a center of the first region is disposed at a position deviated from a center of the imaging surface.

2. The imaging system according to claim 1, wherein the optical system is designed so that a magnification ratio of light that forms an image in the first region is larger than a magnification ratio of light that forms an image in the second region excluding the first region.

3. The imaging system according to claim 1, wherein the optical system includes a free-form surface lens.

4. A display system comprising:
the imaging system according to claim 1; and
a display apparatus that displays, of the captured image, at least one of a first image generated in the first region and a second image generated in the second region.

5. The display system according to claim 4, wherein the display apparatus includes a first display apparatus that displays the first image and a second display apparatus that displays the second image.

6. The display system according to claim 5, wherein the first display apparatus displays the first image while the moving body is moving.

7. The display system according to claim 5, wherein the second display apparatus displays the second image when the moving body moves backwards.

8. The display system according to claim 4, wherein the moving body is any one of an automobile, a train, a vessel, an airplane, a robot, a robot arm, and a drone.

\* \* \* \* \*